(12) United States Patent
Kaneko et al.

(10) Patent No.: US 12,182,991 B2
(45) Date of Patent: Dec. 31, 2024

(54) IMAGE PROCESSING APPARATUS, IMAGE FORMING APPARATUS, AND IMAGE PROCESSING METHOD

(71) Applicant: KYOCERA Document Solutions Inc., Osaka (JP)

(72) Inventors: Shiro Kaneko, Osaka (JP); Hiroka Itani, Osaka (JP); Koji Sato, Osaka (JP); Naomichi Higashiyama, Osaka (JP)

(73) Assignee: Kyocera Document Solutions, Inc. (JP)

( * ) Notice: Subject to any disclaimer, the term of this patent is extended or adjusted under 35 U.S.C. 154(b) by 387 days.

(21) Appl. No.: 17/844,196

(22) Filed: Jun. 20, 2022

(65) Prior Publication Data

US 2022/0414852 A1    Dec. 29, 2022

(30) Foreign Application Priority Data

Jun. 29, 2021    (JP) .................................. 2021-108184

(51) Int. Cl.
*G06T 7/00*    (2017.01)
*G06T 7/11*    (2017.01)

(52) U.S. Cl.
CPC ................ *G06T 7/001* (2013.01); *G06T 7/11* (2017.01); *G06T 2207/30108* (2013.01)

(58) Field of Classification Search
CPC ......... G06T 7/149; G06T 7/11; G06V 10/776; G06F 18/217
See application file for complete search history.

(56) References Cited

U.S. PATENT DOCUMENTS

| 7,317,542 | B2 * | 1/2008 | Krambeer | .......... G01N 21/8903 |
| | | | | 356/429 |
| 10,068,318 | B2 * | 9/2018 | Dzyubak | ................ A61B 6/486 |
| 10,489,678 | B2 * | 11/2019 | Haas | ...................... G06T 7/149 |
| 10,630,889 | B1 * | 4/2020 | Stout | ................. G06F 18/24147 |
| 10,755,384 | B2 * | 8/2020 | Akiyama | ............... G06V 10/98 |
| 10,809,635 | B2 * | 10/2020 | Chen | .................... G01N 21/956 |

FOREIGN PATENT DOCUMENTS

JP    2017-223892    12/2017

* cited by examiner

*Primary Examiner* — Yosef Kassa

(57) ABSTRACT

An anomaly detecting unit detects an anomaly object in a target image. A characteristic amount watching unit watches at least two basic characteristic amounts of the anomaly object, determines whether values of the basic characteristic amounts satisfy a predetermined watching determination condition of any one of predetermined plural anomaly types or not, if it is determined that the values of the basic characteristic amounts satisfy the watching determination condition, determines as an auxiliary characteristic amount for the anomaly object a characteristic amount corresponding to the anomaly type of which the values of the basic characteristic amounts satisfy the watching determination condition, and starts watching a value of the auxiliary characteristic amount. An anomaly type determining unit determines an anomaly type of the anomaly object on the basis of the basic characteristic amounts and the auxiliary characteristic amount currently watched by the characteristic amount watching unit.

12 Claims, 10 Drawing Sheets

IMAGE PROCESSING APPARATUS, IMAGE FORMING APPARATUS, AND IMAGE PROCESSING METHOD

CROSS-REFERENCE TO RELATED APPLICATIONS

This application relates to and claims priority rights from Japanese Patent Application No. 2021-108184, filed on Jun. 29, 2021, the entire disclosures of which are hereby incorporated by reference herein.

BACKGROUND

1. Field of the Present Disclosure

The present disclosure relates to an image processing apparatus, an image forming apparatus, and an image processing method.

2. Description of the Related Art

In an image forming apparatus such as a multi function peripheral or a printer, an anomaly image (anomaly object) generally appears on a printed matter or a scanned image due to a specific cause in the image forming apparatus. For example, the anomaly image is an unintentional line or dot, an unevenness over a whole of a printed matter or a scanned image, or the like.

An image forming apparatus outputs a test pattern of plural toner colors and white, and determines an anomaly cause on the basis of an anomaly object having a dot shape or a line shape in the outputted test pattern.

However, the aforementioned image forming apparatus requires to print a lot of test patterns, and consequently, requires a long time to determine an anomaly cause. In addition, the anomaly cause may not be properly determined when referring the test patterns outputted at a single time point.

SUMMARY

An image processing apparatus according to an aspect of the present disclosure includes an anomaly detecting unit, a characteristic amount watching unit, and an anomaly type determining unit. The anomaly detecting unit is configured to detect an anomaly object in a target image. The characteristic amount watching unit is configured to (a) watch at least two basic characteristic amounts of the anomaly object, (b) determine whether values of the basic characteristic amounts satisfy a predetermined watching determination condition of any one of predetermined plural anomaly types or not, (c) if it is determined that the values of the basic characteristic amounts satisfy the watching determination condition, determine as an auxiliary characteristic amount for the anomaly object a characteristic amount corresponding to the anomaly type of which the values of the basic characteristic amounts satisfy the watching determination condition, and (d) start watching a value of the auxiliary characteristic amount. The anomaly type determining unit is configured to determine an anomaly type of the anomaly object on the basis of the basic characteristic amounts and the auxiliary characteristic amount currently watched by the characteristic amount watching unit.

An image forming apparatus according to an aspect of the present disclosure includes the aforementioned image processing apparatus, and an internal device configured to generate the target image.

An image processing method according to an aspect of the present disclosure includes the steps of: detecting an anomaly object in a target image; (a) watching at least two basic characteristic amounts of the anomaly object, (b) determining whether values of the basic characteristic amounts satisfy a predetermined watching determination condition of any one of predetermined plural anomaly types or not, (c) if it is determined that the values of the basic characteristic amounts satisfy the watching determination condition, determining as an auxiliary characteristic amount for the anomaly object a characteristic amount corresponding to the anomaly type of which the values of the basic characteristic amounts satisfy the watching determination condition, and (d) starting watching a value of the auxiliary characteristic amount; and determining an anomaly type of the anomaly object on the basis of the currently watched basic characteristic amounts and the currently watched auxiliary characteristic amount.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
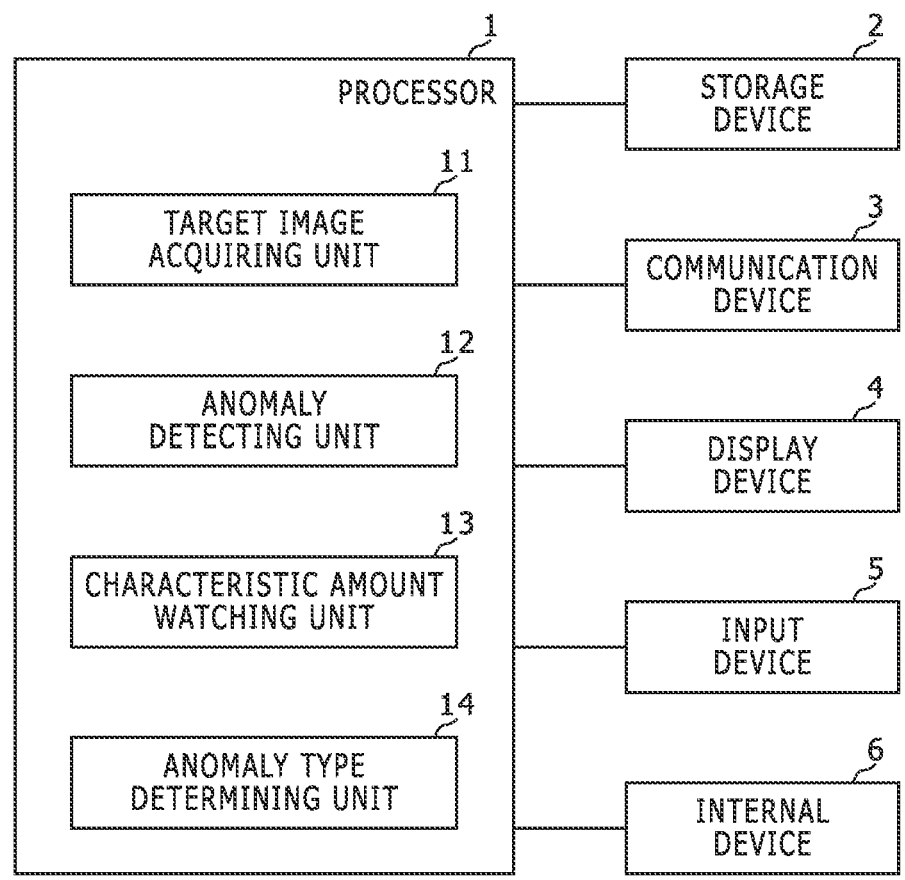
FIG. 1 shows a block diagram that indicates a configuration of an image processing apparatus according to an embodiment of the present disclosure.

FIG. 1 shows a block diagram that indicates a configuration of an image processing apparatus according to an embodiment of the present disclosure. An image processing apparatus shown in FIG. 1 is an information processing apparatus such as personal computer or server, or an electronic apparatus such as digital camera or image forming apparatus (scanner, multi function peripheral or the like), and includes a processor 1, a storage device 2, a communication device 3, a display device 4, an input device 5, an internal device 6 and the like.

The processor 1 includes a computer and executes an image processing program using the computer and thereby acts as sorts of processing units. Specifically, this computer includes a CPU (Central Processing Unit), a ROM (Read Only Memory), a RAM (Random Access Memory) and the like, and loads a program stored in the ROM or the storage device 2 to the RAM and executes the program using the CPU and thereby acts as specific processing units. Further, the processor 1 may include an ASIC (Application Specific Integrated Circuit) that acts as a specific processing unit.

The storage device 2 is a non-volatile storage device such as flash memory, and stores an image processing program and data required for a process mentioned below. The image processing program is, for example, stored in a non-transitory computer readable recording medium and installed into the storage device 2 from the recording medium.

The communication device 3 is a device that performs data communication with an external device, such as network interface or a peripheral interface. The display device 4 is a device that displays sorts of information to a user, such as a display panel of a liquid crystal display. The input device 5 is a device that detects a user operation, such as keyboard or touch panel.

The internal device 6 is a device that performs a specific function of this image processing apparatus. For example, if this image processing apparatus is an image forming apparatus, the internal device 6 is an image scanning device that optically scans a document image from a document, a printing device that prints an image on a print sheet and/or the like.

Here, the processor 1 acts as a target image acquiring unit 11, an anomaly detecting unit 12, a characteristic amount watching unit 13, and an anomaly type determining unit 14, as the aforementioned processing units.

The target image acquiring unit 11 acquires a target image (image data) from the storage device 2, the communication device 3, the internal device 6 or the like, and stores the target image into the RAM or the like. The target image is obtained by scanning a printed matter obtained by printing a predetermined reference image, for example. The reference image (image data) has been stored in the storage device 2 in advance.

The anomaly detecting unit 12 compares the target image and the reference image with each other and thereby detects an anomaly object in the target image.

For example, the anomaly detecting unit 12 (*a*) generates a first characteristic map obtained by performing a filter process for the target image and a second characteristic map obtained by performing the same filter process for the reference image, (b) generates a difference image between the first characteristic map and the second characteristic map, and (c) detects an object in the difference image as an anomaly object. This filter process is set in accordance with a type of the anomaly object such as line, dot, or unevenness (density unevenness or color unevenness). As this filter process, a second derivative filter, a Gabor filter or the like is used, for example.

The characteristic amount watching unit 13 (*a*) watches at least two basic characteristic amounts of the anomaly object, (b) determines whether values of the basic characteristic amounts satisfy a predetermined watching determination condition of any one of predetermined plural anomaly types or not, (c) if it is determined that the values of the basic characteristic amounts satisfy the watching determination condition, determines as an auxiliary characteristic amount for the anomaly object a characteristic amount corresponding to the anomaly type of which the values of the basic characteristic amounts satisfy the watching determination condition, and (d) starts watching a value of the auxiliary characteristic amount.

The anomaly type means a type of an anomaly cause (an anomaly part or the like) or the like. Such anomaly part is an exchangeable consumable unit, for example.

For the watching of values of the basic characteristic amounts (or of the basic characteristic amounts and an auxiliary characteristic amount), the target image acquiring unit 11 repeatedly acquires the target image with a specific time interval or at measurement timings, the anomaly detecting unit 12 detects an anomaly object in the target image at each time point that the target image is acquired, and the characteristic amount watching unit 13 determines values of the basic characteristic amounts (or of the basic characteristic amounts and the auxiliary characteristic amount) of the detected anomaly object.

Here, the basic characteristic amounts and the auxiliary characteristic amount have been selected for each anomaly type from a predetermined characteristic amount group, and the basic characteristic amounts are always to be watched but the auxiliary characteristic amount is to be watched only when the basic characteristic amounts satisfy a specific condition.

For example, this predetermined characteristic amount group includes as characteristic amounts an area of an anomaly object, an orientation of an anomaly object, a prolonging direction of an anomaly object, a density of an anomaly object, an edge strength of an anomaly object, a color of an anomaly object, a period of anomaly objects, the number of one or more anomaly objects, and/or the like.

Figure 2:
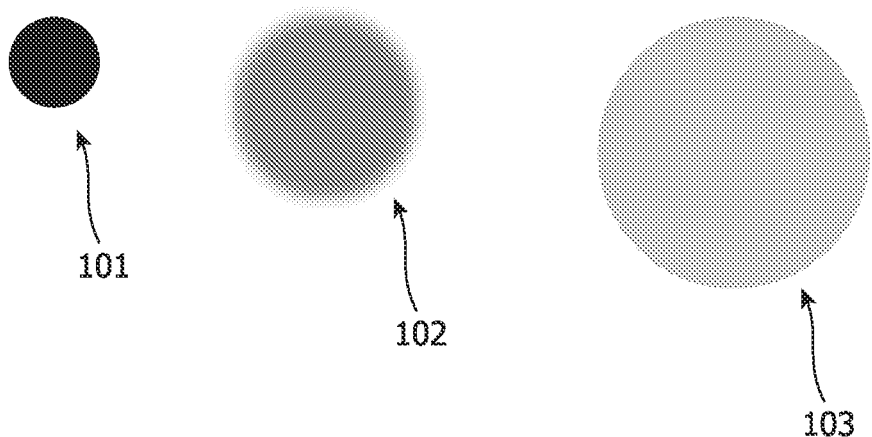
FIG. 2 shows a diagram that explains a characteristic amount of an anomaly object.

FIG. 2 shows a diagram that explains a characteristic amount of an anomaly object. For example, anomaly objects 101, 102, and 103 in FIG. 2 are anomaly objects of the anomaly type "dot", and areas, densities and edge strengths are different among the anomaly objects 101, 102, and 103.

Here, the orientation of an anomaly object is a longitudinal direction of the anomaly object; the prolonging direction of an anomaly object is a prolonging direction that is determined from shapes of the anomaly object obtained at time points with a specific time interval; the density of an anomaly object is (a) an average value or (b) a median value of densities of an anomaly object part in the target image corresponding to the anomaly object or (c) a difference value of average values or median values between the anomaly object part and a part other than the anomaly object part in the target image; the edge strength of an anomaly object part is a density gradient at an edge of the anomaly object part in the target image; the color of an anomaly object part is a color at the anomaly object part in the target image; the period of anomaly object parts is a spatial period of the anomaly objects; and the number of anomaly objects is the number of one or plural anomaly objects of each object type.

Figure 3:
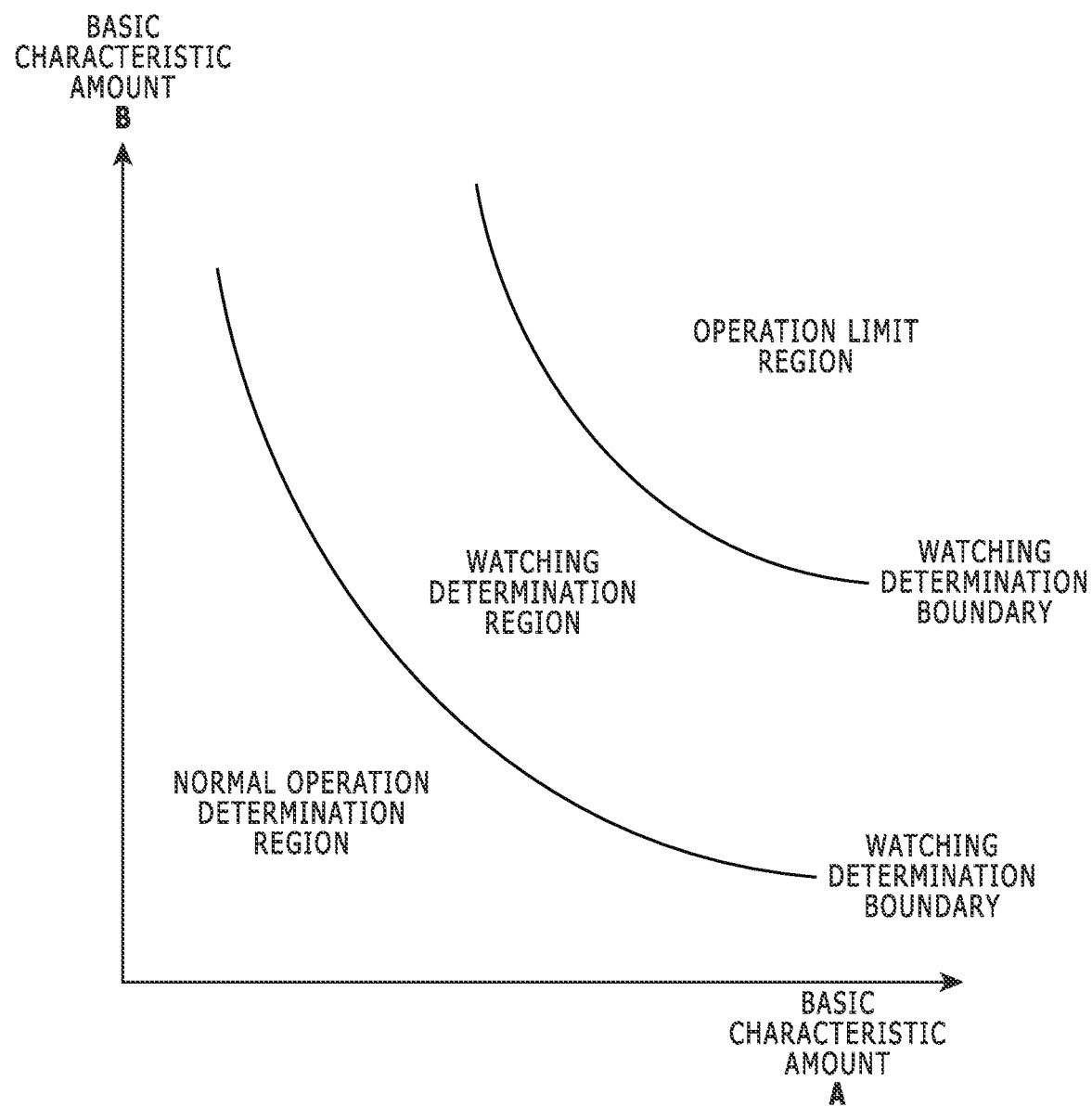
FIG. 3 shows a diagram that explains a normal operation determination region, a watching determination region, and an operation limit region in a basic characteristic amount space for each anomaly type.

FIG. 3 shows a diagram that explains a normal operation determination region, a watching determination region, and an operation limit region in a basic characteristic amount space for each anomaly type.

As shown in FIG. 3, for example, in a basic characteristic amount space (here, a 2-dimensional planar space by a basic characteristic amount A and a basic characteristic amount B), a normal determination region, a watching determination region, and a usage limit determination region exist for each anomaly type. The usage limit determination region is a region in which it is determined as life end or failure. The normal determination region is a region in which it is determined as normal, and the watching determination region is a region in which it is determined as being in a prior phase before life end or failure. In the normal determination region, values of the basic characteristic amounts are watched (without watching a value of the auxiliary characteristic amount); and in the watching determination region, values of the basic characteristic amounts are watched and therewith a value of the auxiliary characteristic amount is watched at least until the anomaly type is determined.

Figure 4:
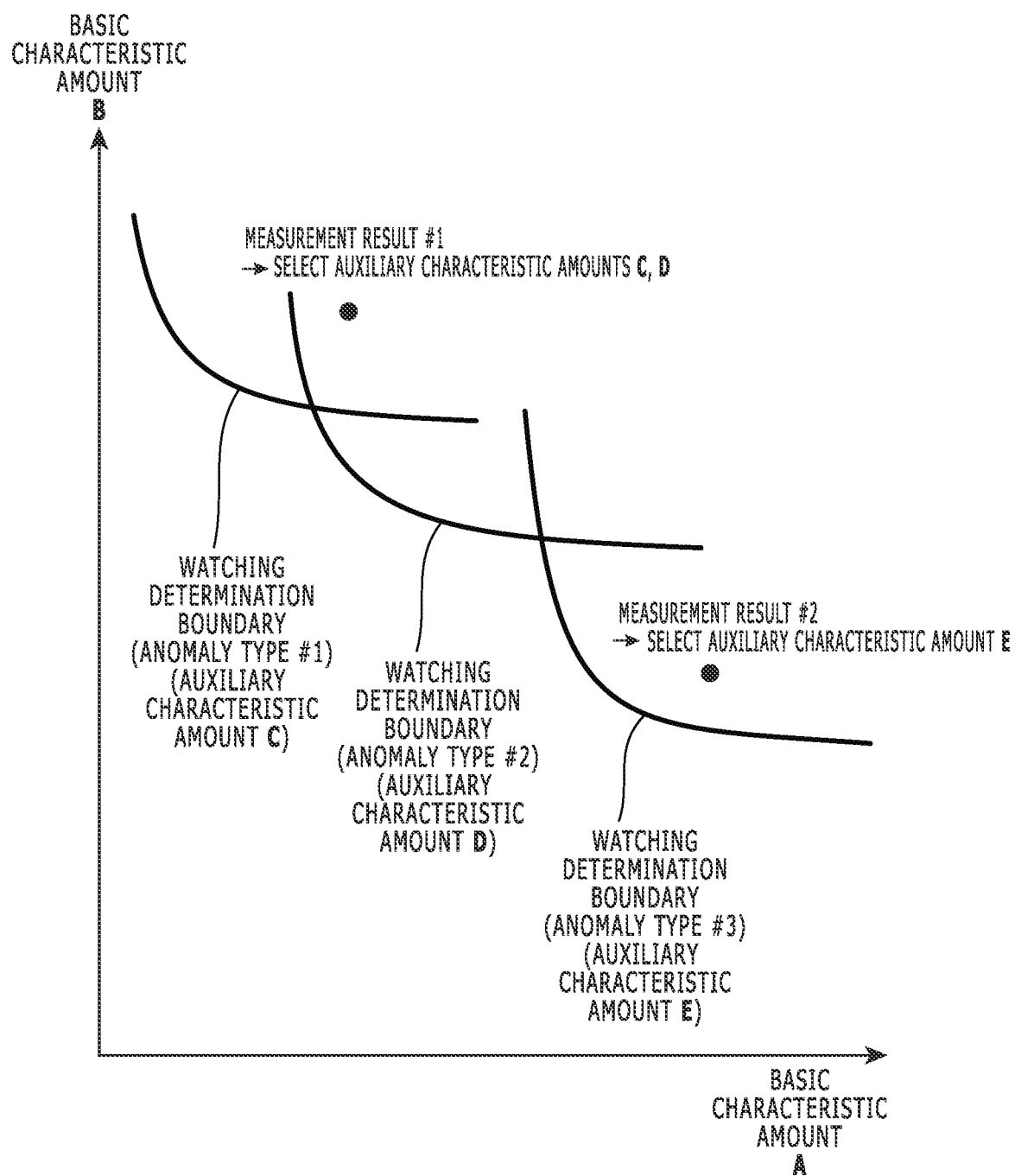
FIG. 4 shows a diagram that explains selection of an auxiliary characteristic amount additionally watched in accordance with values of basic characteristic amounts.

FIG. 4 shows a diagram that explains selection of an auxiliary characteristic amount additionally watched in accordance with values of basic characteristic amounts. If plural anomaly types are specified to be determined, there are boundaries (watching determination boundaries) between the normal determination regions and the watching determination regions of the anomaly types, respectively, and if values of the basic characteristic amounts (i.e. a coordinate of the basic characteristic amounts in the space) enter the watching determination region over the watching determination boundary, watching of the auxiliary characteristic amount is started. For example, as shown in FIG. 4, in a measurement result #1, values of the basic characteristic amounts A and B are in a watching determination region of an anomaly type #1 and also in a watching determination region of an anomaly type #2; and consequently, as auxiliary characteristic amounts of which watching should be started, selected are an auxiliary characteristic amount C for the anomaly type #1 and an auxiliary characteristic amount D for the anomaly type #2. Further, as shown in FIG. 4, for example, in a measurement result #2, values of the basic characteristic amounts A and B are in a watching determination region of an anomaly type #3; and consequently, as an auxiliary characteristic amount of which watching should be started, an auxiliary characteristic amount E for the anomaly type #3 is selected.

The watching of the auxiliary characteristic amount(s) is started and terminated in accordance with values of the basic characteristic amounts A and B. In this embodiment, the characteristic amount watching unit 13 derives an anomaly level r from values of characteristic amounts in watching (e.g. the basic characteristic amounts A and B); and if a value of the anomaly level r exceeds a predetermined threshold value TH1 for an anomaly type, the characteristic amount watching unit 13 determines that the values of the basic characteristic amounts enter the watching determination region over the watching determination boundary of this anomaly type (i.e. determines that the watching determination condition is satisfied), and starts watching an auxiliary characteristic amount corresponding to this anomaly type. Further, if a value of the anomaly level r gets less than a predetermined threshold value TH2 for this anomaly type, the characteristic amount watching unit 13 terminates the watching of the auxiliary characteristic amount corresponding to this anomaly type.

The anomaly level r is derived using a function, a table or the like, the function, the table or the like has been determined in advance through an experiment or the like, and may be approximately expressed as a linear expression (r=W1*A+W2*B+W3, W1, W2, and W3 are constants) or the like. The threshold value TH2 may be identical to the threshold value TH1 or may be different from the threshold value TH1.

Figure 5:
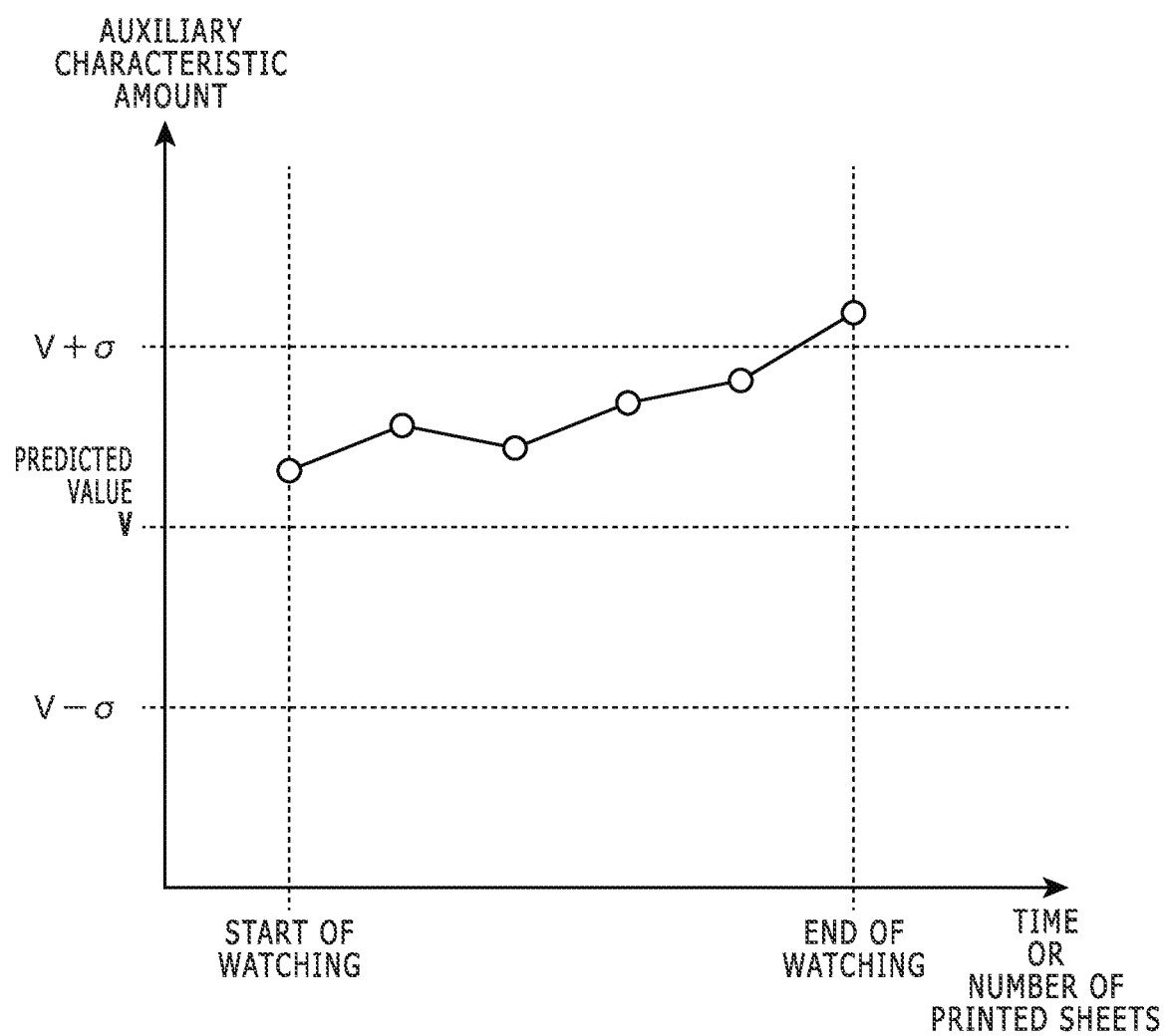
FIG. 5 shows a diagram that explains a start and an end of watching the auxiliary characteristic amount.

Further, it is individually determined whether the watching of each auxiliary characteristic amount should be terminated or not. If plural auxiliary characteristic amounts are in watching, it is individually determined whether the watching of each of the auxiliary characteristic amounts should be terminated or not. FIG. 5 shows a diagram that explains a start and an end of watching the auxiliary characteristic amount. As shown in FIG. 5, for example, if a value of the auxiliary characteristic amount in watching goes out of an allowable error range σ from a specific predicted value V, then the characteristic amount watching unit 13 terminates the watching of a value of this auxiliary characteristic amount. The predicted value V is derived from values of the basic characteristic amounts when starting the watching, using a predetermined calculation formula, a table or the like. The predicted value V and the allowable error range σ are individually set for each auxiliary characteristic amount.

Further, the characteristic amount watching unit 13 (a) determines plural auxiliary characteristic amount sets as a characteristic amount corresponding to a specific anomaly type, (b) selects one of the plural auxiliary characteristic amount sets and determines as the auxiliary characteristic amount one or plural characteristic amounts included by the selected auxiliary characteristic amount set, and (c) if the watching is terminated of all of the one or plural characteristic amounts included by the selected auxiliary characteristic amount set, selects another auxiliary characteristic amount set among the plural auxiliary characteristic amount sets and determines as the auxiliary characteristic amount one or plural characteristic amounts included by the selected auxiliary characteristic amount set. The plural auxiliary characteristic amount set are selected in turn in a predetermined priority order.

For example, if the measurement result #1 is obtained as shown in FIG. 4, then it is set as the aforementioned auxiliary characteristic amount, specified is a set including the auxiliary characteristic amounts C and D, a set including only the auxiliary characteristic amount C, a set including only the auxiliary characteristic amount D or the like. This characteristic amount set may include an auxiliary characteristic amount in association with an anomaly type of which the watching determination boundary exists within a predetermined distance range from values (a coordinate) of the basic characteristic amounts. Here, an auxiliary characteristic amount E in association with an anomaly type #3 may be included, and therefore the aforementioned plural auxiliary characteristic amount sets may include a set including the auxiliary characteristic amounts C, D, and E, or a set including only the auxiliary characteristic amount E.

The characteristic amount watching unit 13 may (a) select one anomaly type among anomaly types other than the anomaly type of the auxiliary characteristic amount to be watched, on the basis of a distance from current values of the basic characteristic amounts to values of the basic characteristic amounts that satisfy the watching determination condition of an anomaly type other than the auxiliary characteristic amount to be watched (for example, regarding the measurement result #1 in FIG. 4, a distance from the position of the measurement result #1 to the watching determination boundary of the anomaly type #3), and (b) include the auxiliary characteristic amount corresponding to the selected anomaly type into the auxiliary characteristic amount set. Thus, if an aforementioned distance of an anomaly type is equal to or less than a predetermined value, then such anomaly type is selected, but otherwise if not, such anomaly type is not selected.

Further, in the priority order of the auxiliary characteristic amount sets, an auxiliary characteristic amount set that includes the both auxiliary characteristic amounts C and D has the highest priority because the auxiliary characteristic amounts C and D corresponds to two anomaly types that values of the basic characteristic amounts A and B enter the watching determination region; next to the highest priority, an auxiliary characteristic amount set that includes only one of the auxiliary characteristic amounts C and D has a high priority; and a priority of an auxiliary characteristic amount set that includes the auxiliary characteristic amount E corresponding to an adjacent watching determination boundary is set to be lower than a priority of an auxiliary characteristic amount set that does not include the auxiliary characteristic amount E. For example, regarding the measurement result #1, as a descending order, the priority order is the set of the auxiliary characteristic amounts C and D, the set of the auxiliary characteristic amounts D only, the set of the auxiliary characteristic amounts C only, the set of the auxiliary characteristic amounts C, D and E, then the set of the auxiliary characteristic amount E.

Further, if a measurement result #2 is obtained as shown in FIG. 4, specified are a set of the auxiliary characteristic amount E only, and a set of the auxiliary characteristic amount E and the auxiliary characteristic amount D corresponding to an adjacent watching determination boundary. In this case, regarding the measurement result #2, on the basis of the aforementioned distance, an anomaly type #2 (the auxiliary characteristic amount D) is selected but an anomaly type #1 (the auxiliary characteristic amount C) is not selected. For example, regarding the measurement result #2, as a descending order, the priority order is the set of the auxiliary characteristic amount E, then the set of the auxiliary characteristic amounts D and E.

If values of plural auxiliary characteristic amounts (e.g. the auxiliary characteristic amounts C and D) is in watching, and a part of the plural auxiliary characteristic amounts goes out of a range corresponding to values of the basic characteristic amounts but a remaining part of the plural auxiliary characteristic amounts does not go out of a range corresponding to values of the basic characteristic amounts, then the characteristic amount watching unit 13 terminates the watching of the part of the plural auxiliary characteristic amounts that goes out of the range and continues the watching of the remaining part of the plural auxiliary characteristic amounts.

Further, if the anomaly level r and a fluctuation width (the aforementioned allowable error range σ, the same applies hereafter) of values of the auxiliary characteristic amount are equal to or less than predetermined values during a predetermined period (a period having a predetermined time length from a starting time point of watching the auxiliary characteristic amount, the same applies hereafter), then the characteristic amount watching unit 13 terminates the watching of this auxiliary characteristic amount.

Returning to FIG. 1, the anomaly type determining unit 14 determines an anomaly type corresponding to the anomaly object on the basis of the basic characteristic amounts (or on the basis of the basic characteristic amounts and the auxiliary characteristic amount) currently watched by the characteristic amount watching unit 13. An administrator, a service person or the like is notified of the determined anomaly type; and/or the determined anomaly type is used to resolve the anomaly.

Specifically, if fluctuation widths of values of the anomaly level r and the auxiliary characteristic amount are equal to or less than predetermined values during the predetermined period, the anomaly type determining unit 14 determines that this auxiliary characteristic amount is converged and there is a correlation between this auxiliary characteristic amount and the anomaly level r, and consequently determines that this anomaly type is an anomaly type that causes the detected anomaly object.

Further, if the aforementioned anomaly level r of this anomaly type exceeds a determination threshold value δ, the anomaly type determining unit 14 determines that a part corresponding to this anomaly type reaches a usage limit (i.e. life end or failure status). In this embodiment, even though the characteristic amount watching unit 13 watches values of respective auxiliary characteristic amounts corresponding to predetermined plural anomaly types, if the anomaly type determining unit 14 can not determine the anomaly type corresponding to the anomaly object, the anomaly type determining unit 14 determines that the anomaly object is an anomaly object of an unknown anomaly type. An administrator, a service person or the like is notified of these determination result.

Further, if fluctuation widths of values of the anomaly level r and the auxiliary characteristic amount are equal to or less than predetermined values during the predetermined period, the characteristic amount watching unit 13 set this determination threshold value S. Here the determination threshold value δ may be a pre-specified value or may be set on the basis of the value of this auxiliary characteristic amount. Furthermore, (a) if fluctuation widths of values of the anomaly level and the auxiliary characteristic amount are equal to or less than predetermined values during the predetermined period, the characteristic amount watching unit 13 selects a characteristic amount for watching image quality and adds the selected characteristic amount to the auxiliary characteristic amount; and (b) if a value of the characteristic amount for watching image quality in watching exceeds a predetermined threshold value, the characteristic amount watching unit 13 determines that image quality degradation occurs. Here the characteristic amount for watching image quality may be a pre-specified or may be selected from the auxiliary characteristic amount in watching (in accordance with a parameter on image quality).

Figure 6:
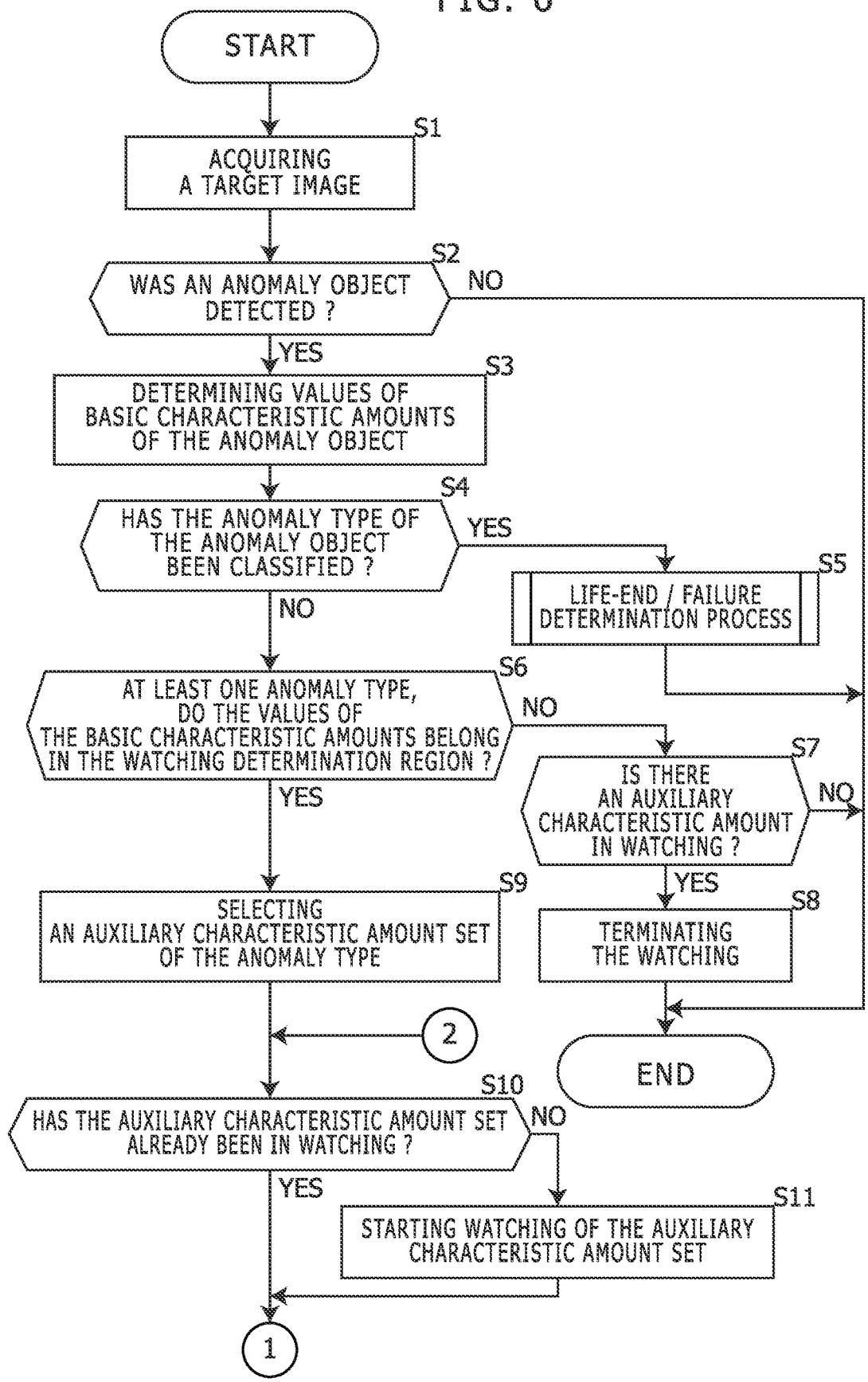
FIG. 6 shows a flowchart that explains a behavior of the image processing apparatus shown in FIG. 1; (part 1/2)
Figure 7:
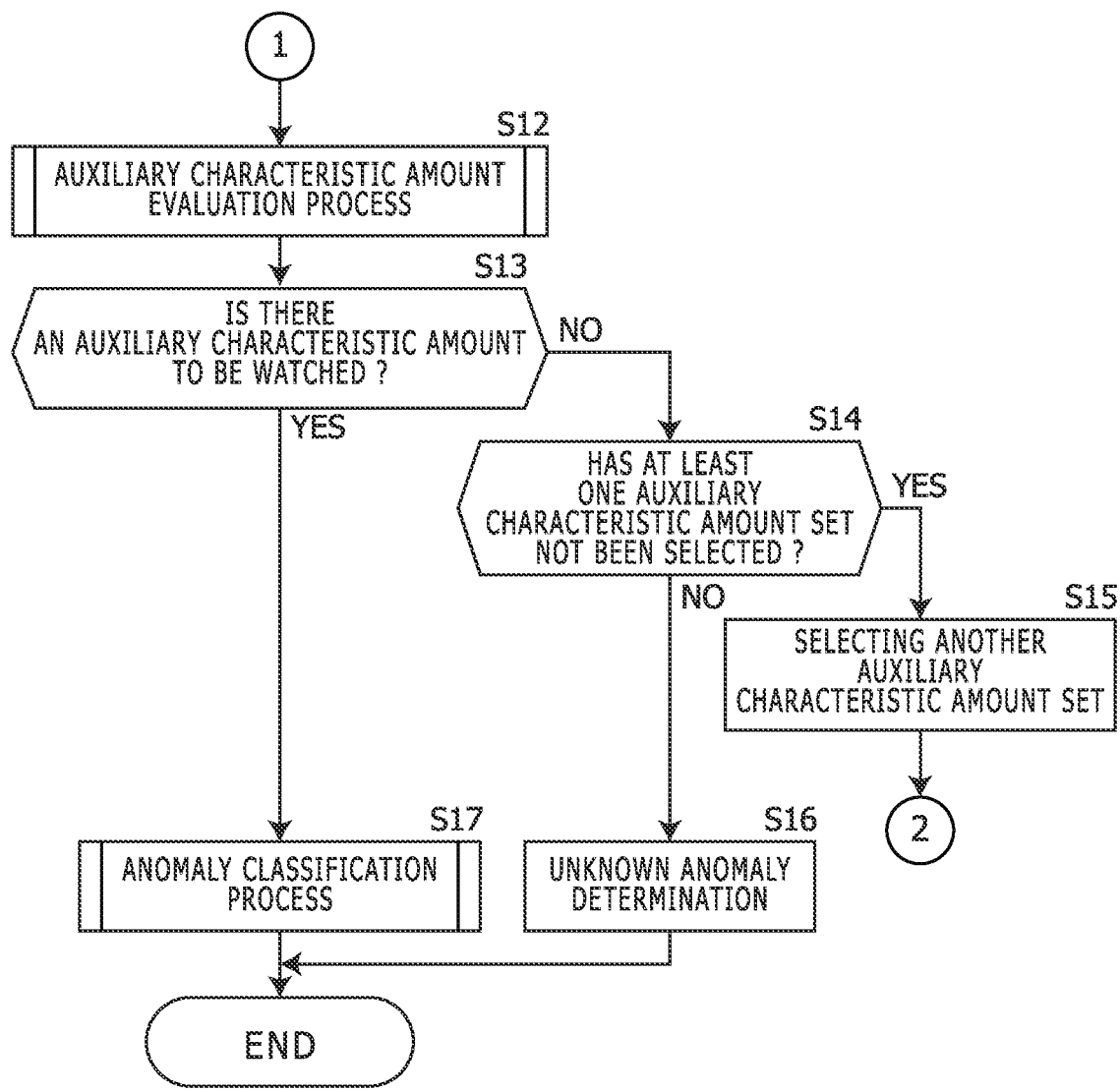
FIG. 7 shows a flowchart that explains a behavior of the image processing apparatus shown in FIG. 1; (part 2/2)

The following part explains a behavior of the image processing apparatus in FIG. 1. FIGS. 6 and 7 show a flowchart that explains a behavior of the image processing apparatus shown in FIG. 1.

The target image acquiring unit 11 acquires a target image (image data) (in Step S1). When the target image is acquired, the anomaly detecting unit 12 tries to detect an anomaly object on the basis of the target image and the reference image, and determines whether an anomaly object was detected or not (in Step S2).

If no anomaly objects were detected, it is determined as normal status, and therefore a repair process or the like is not performed.

If an anomaly object was detected, the characteristic amount watching unit 13 determines values of basic characteristic amounts of the detected anomaly object (i.e. a coordinate value in the basic characteristic amount space formed by values of plural basic characteristic amounts) (in Step S3).

The characteristic amount watching unit 13 determines whether an anomaly type of this anomaly object has been classified or not (in Step S4). If an anomaly type of this anomaly object has been classified, the characteristic amount watching unit 13 performs a life-end/failure determination process (in Step S5).

Figure 8:
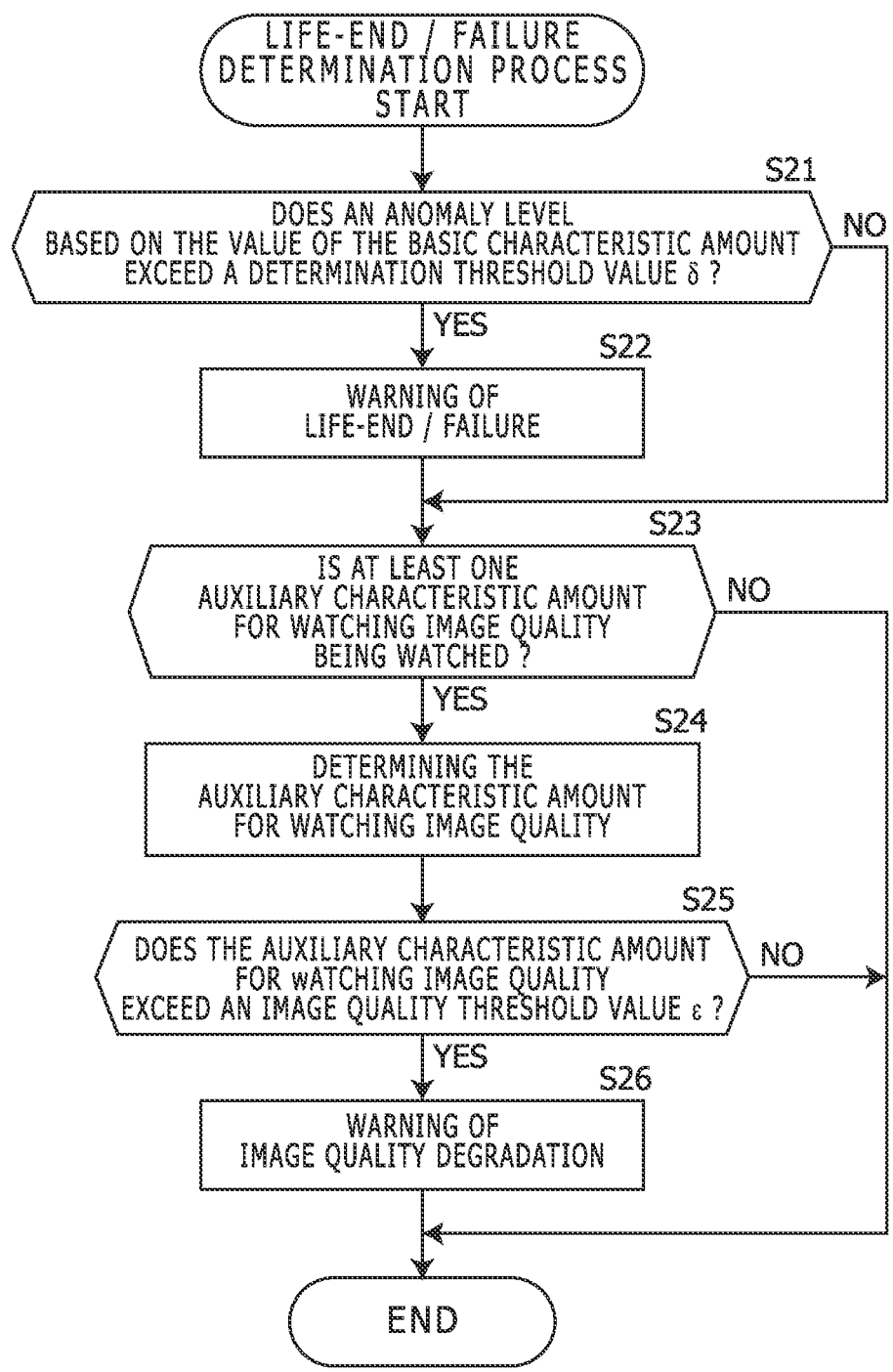
FIG. 8 shows a diagram that explains a life-end/failure determination process shown in FIG. 6.

FIG. 8 shows a diagram that explains a life-end/failure determination process shown in FIG. 6. In the life-end/failure determination process, regarding the determined anomaly type, it is determined whether a value of the aforementioned anomaly level r based on the basic characteristic amounts (including no auxiliary characteristic amounts) exceeds a determination threshold value δ or not (in Step S21); and if the value of the anomaly level r exceeds the determination threshold value δ, a warning of life-end/failure is outputted (in Step S22). Further, it is determined whether there is an auxiliary characteristic amount for watching image quality in watching or not (in Step S23); and if it is determined that there is an auxiliary characteristic amount for watching image quality in watching, a value of this auxiliary characteristic amount for watching image quality is determined (in Step S24); and if it is determined whether this value exceeds an image quality threshold value ε or not (in Step S25). If this value exceeds the image quality threshold value ε, a warning of image quality degradation is outputted (in Step S26).

As mentioned, in accordance with a situation, the aforementioned warning is displayed on the display device 4, for example, and thereby a user or a service person is notified of the image quality degradation or that a specific part in this image processing apparatus reaches a usage limit such as life end or failure.

Return to FIG. 6, if this anomaly object has not been classified, the characteristic amount watching unit 13 determines whether there is an anomaly type of which values of the basic characteristic amounts determined at this time belong to the watching determination region or not on the basis of the aforementioned anomaly level r, for example (in Step S6).

If there is not an anomaly type of which values of the basic characteristic amounts determined at this time belong to the watching determination region, then the characteristic amount watching unit 13 determines whether there is an auxiliary characteristic amount in watching or not (in Step S7); and if there is an auxiliary characteristic amount in watching, then the characteristic amount watching unit 13 terminates the watching of this auxiliary characteristic amount (in Step S8).

Contrarily, if there is an anomaly type of which values of the basic characteristic amounts determined at this time belong to the watching determination region, then the characteristic amount watching unit 13 determines one or plural auxiliary characteristic amounts for this anomaly type as mentioned, and from this one or plural auxiliary characteristic amounts, selects one auxiliary characteristic amount set in accordance with a predetermined priority order (in Step S9). It should be noted that the watching is terminated of auxiliary characteristic amounts other than the selected auxiliary characteristic amount set.

Subsequently, the characteristic amount watching unit 13 determines whether the selected auxiliary characteristic amount set (i.e. auxiliary characteristic amount(s) in this set) has already been in watching or not (in Step S10); and if the selected auxiliary characteristic amount set (i.e. auxiliary characteristic amount(s) in this set) has not been in watching, the characteristic amount watching unit 13 starts watching the selected auxiliary characteristic amount set (in Step S11).

The characteristic amount watching unit 13 performs an auxiliary characteristic amount evaluation process for the auxiliary characteristic amount in watching (i.e. the auxiliary characteristic amount that belongs to the selected auxiliary characteristic amount set) (in Step S12). In the auxiliary characteristic amount evaluation process, it is determined whether the watching of each auxiliary characteristic amount in watching should be continued or not.

Figure 9:
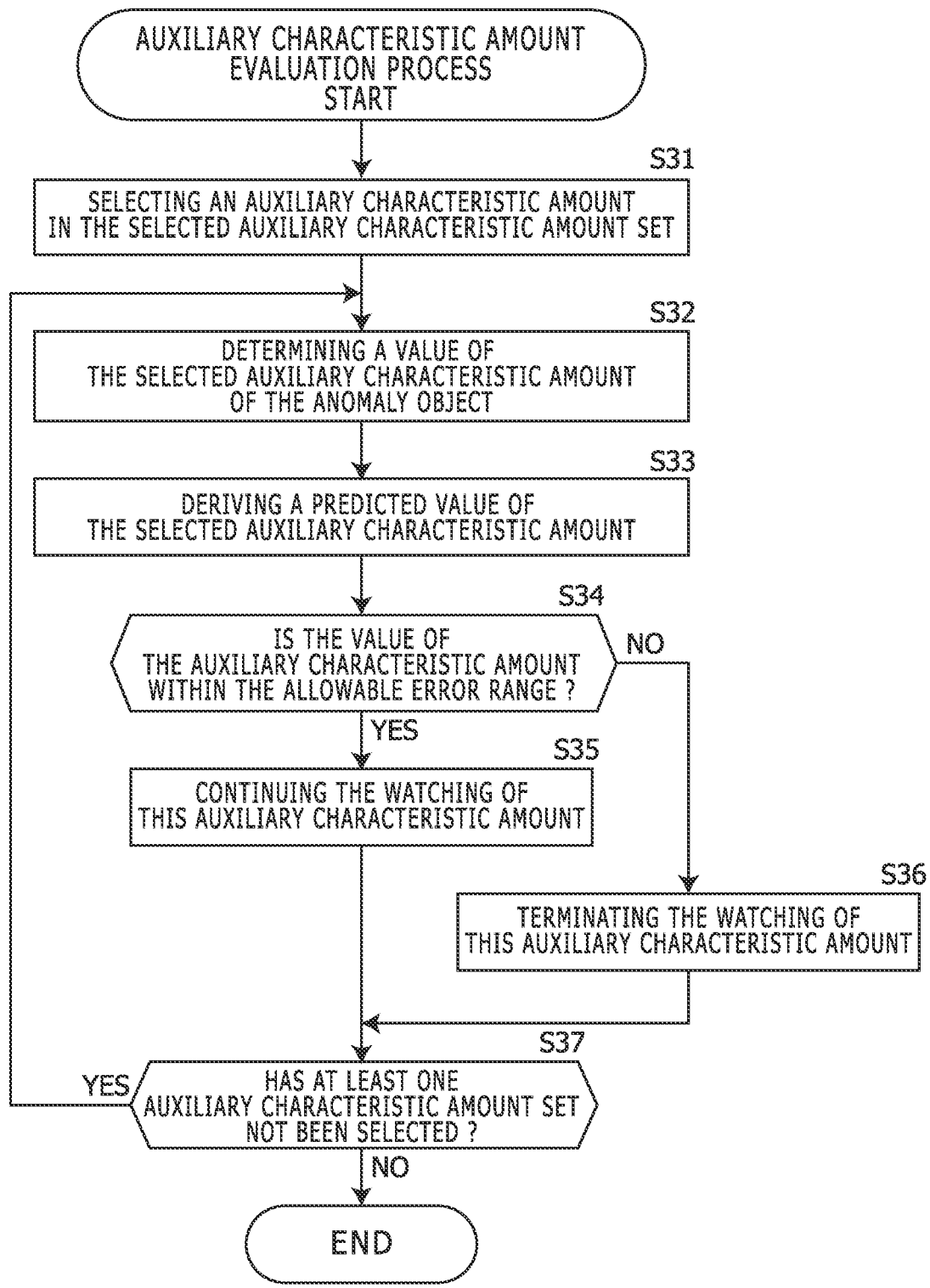
FIG. 9 shows a diagram that explains an auxiliary characteristic amount evaluation process shown in FIG. 7.

FIG. 9 shows a diagram that explains an auxiliary characteristic amount evaluation process shown in FIG. 7. As shown in FIG. 9, in the auxiliary characteristic amount evaluation process, one auxiliary characteristic amount is selected from auxiliary characteristic amount(s) that belong to the selected auxiliary characteristic amount set (in Step S31), and a value of the selected auxiliary characteristic amount is determined of the anomaly object (in Step S32). Meanwhile, the predicted value V of this auxiliary characteristic amount is derived as mentioned (in Step S33), and it is determined whether the value of this auxiliary characteristic amount is in the allowable error range or not (in Step S34). If the value of this auxiliary characteristic amount is in the allowable error range, the watching of this auxiliary characteristic amount is continued (in Step S35), and otherwise if not, the watching of this auxiliary characteristic amount is terminated (in Step S36). Subsequently, it is determined whether there is an unselected auxiliary characteristic amount among auxiliary characteristic amount(s) that belong to the selected auxiliary characteristic amount set (in Step S37), and until such unselected auxiliary characteristic amount does not exist, return to Step S32, one of unselected auxiliary characteristic amounts is selected, and the same process is performed for the selected one.

Values of auxiliary characteristic amounts of anomaly types different from an actual anomaly type tends to get apart from the predicted value V as time goes, and therefore, such auxiliary characteristic amounts are excluded from auxiliary characteristic amounts to be watched.

Return to FIG. 7, after the auxiliary characteristic amount evaluation process, the characteristic amount watching unit 13 determines whether there is an auxiliary characteristic amount of which the watching should be continued or not (in Step S13). If there is not an auxiliary characteristic amount of which the watching should be continued, then the characteristic amount watching unit 13 determines whether there is an unselected auxiliary characteristic amount set among the determined one or plural auxiliary characteristic amount sets or not (in Step S14); and if there is such unselected auxiliary characteristic amount set, one of unselected auxiliary characteristic amount sets is selected (in Step S15), and for the selected auxiliary characteristic amount set, the process in Step S10 and the processes subsequent to Step S10 are performed as well.

Contrarily, if there is not such unselected auxiliary characteristic amount set, the characteristic amount watching unit 13 determines that an unknown anomaly occurs, and displays it and thereby notifies a user or a service person of it (in Step S16).

Otherwise, in Step S13, if there is an auxiliary characteristic amount of which the watching should be continued, the anomaly type determining unit 14 performs an anomaly classification process (in Step S17).

Figure 10:
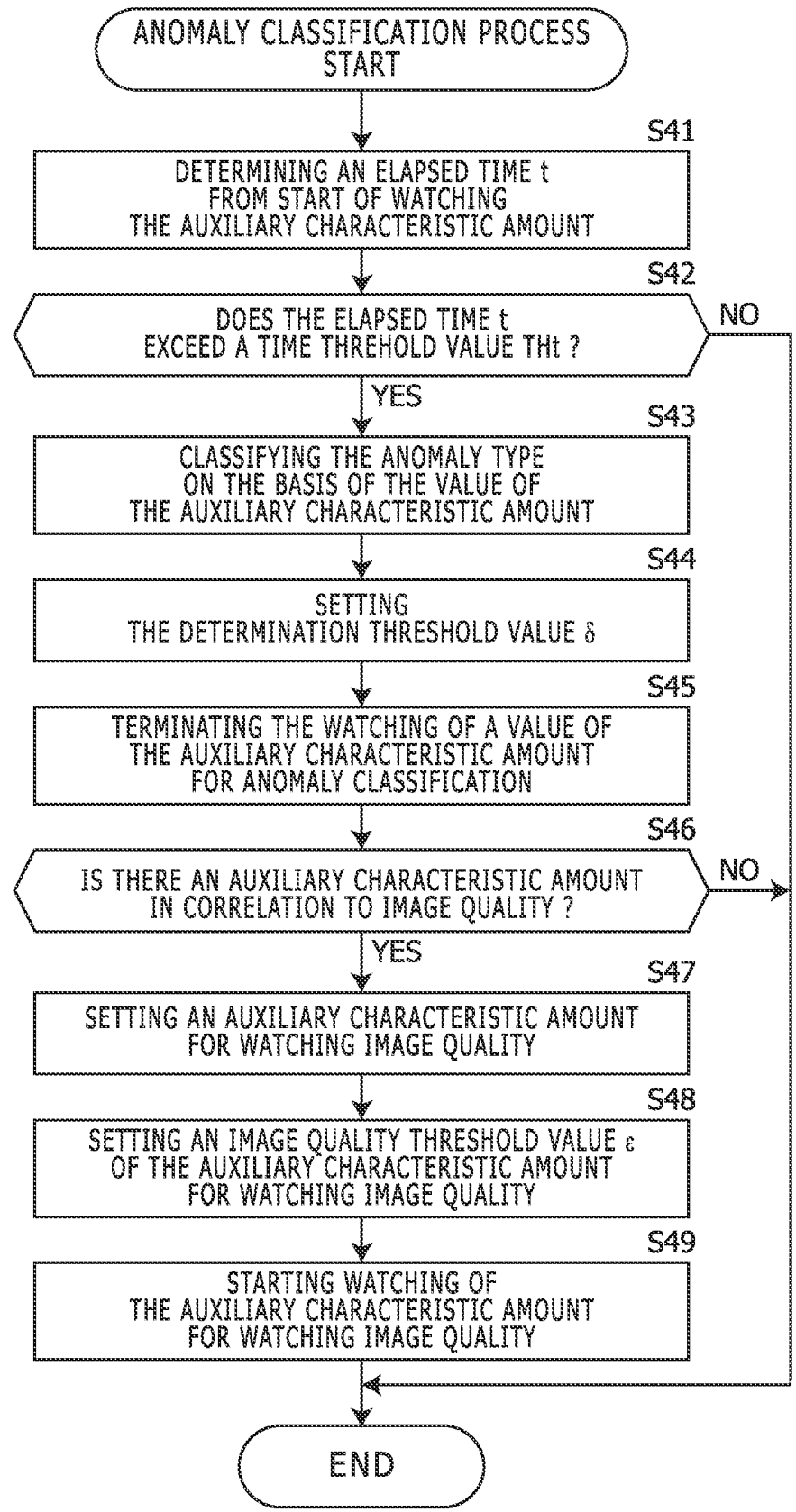
FIG. 10 shows a diagram that explains an anomaly classification process shown in FIG. 7.

FIG. 10 shows a diagram that explains an anomaly classification process shown in FIG. 7. As shown in FIG. 10, in the anomaly classification process, for an auxiliary characteristic amount in watching, an elapsed time t is determined from starting time point of watching this auxiliary characteristic amount (in Step S41). The elapsed time t is measured with a timer (not shown) or the like.

Subsequently, it is determined whether the elapsed time t exceeds a predetermined time threshold value THt or not (in Step S42); and if the elapsed time t exceeds the time threshold value THt, the anomaly type is classified on the basis of a value of the auxiliary characteristic amount because the watching has continued for the time THt (in Step S43).

For example, if there is only one auxiliary characteristic amount in watching, the anomaly object is classified into an anomaly type corresponding to this auxiliary characteristic amount; and there are plural auxiliary characteristic amounts in watching, the anomaly object is classified into an anomaly type that satisfies a predetermined condition among anomaly types corresponding to these auxiliary characteristic amounts (e.g. an anomaly type corresponding to an auxiliary characteristic amount having the largest value among these auxiliary characteristic amounts).

Subsequently, the determination threshold value $\sigma$ is set corresponding to the classified (determined) anomaly type (in Step S44), and the watching of all the auxiliary characteristic amounts is terminated (in Step S45). At this time point, the watching of the basic characteristic amounts is continued. An execution load of the processor 1 is restrained due to the termination of the watching of the auxiliary characteristic amounts.

Here, it is determined whether there is an auxiliary characteristic amount in correlation with image quality or not (in Step S46); and if there is an auxiliary characteristic amount in correlation with image quality, the aforementioned auxiliary characteristic amount for watching image quality is set as one of such auxiliary characteristic amounts in correlation with image quality (in Step S47), the aforementioned image quality threshold value $\varepsilon$ is set (in Step S48), and then watching of the auxiliary characteristic amount for watching image quality is started (in Step S49).

It should be noted that this anomaly classification process is performed when the anomaly level r is low, and thereafter, the anomaly level r gets high and the aforementioned life-end/failure determination process is performed; and therefore, the aforementioned life-end/failure determination process is performed on the basis of the threshold values $\delta$ and $\varepsilon$ set here.

The next part explains a specific example.

As the aforementioned plural anomaly types, exposure anomaly line, charging anomaly line and regulation anomaly line were set, target images were obtained with a time interval of one day during a period of 15 days, and classification into the anomaly types was performed of anomaly objects with line shapes; and a highly accurate classification result was obtained compared to the aforementioned technique based on test patterns of plural toner colors and white.

As mentioned, in the aforementioned embodiment, the anomaly detecting unit 12 detects an anomaly object in a target image. The characteristic amount watching unit 13 (a) watches at least two basic characteristic amounts of the anomaly object, (b) determines whether values of the basic characteristic amounts satisfy a predetermined watching determination condition of any one of predetermined plural anomaly types or not, (c) if it is determined that the values of the basic characteristic amounts satisfy the watching determination condition, determines as an auxiliary characteristic amount for the anomaly object a characteristic amount corresponding to the anomaly type of which the values of the basic characteristic amounts satisfy the watching determination condition, and (d) starts watching a value of the auxiliary characteristic amount. The anomaly type determining unit 14 determines an anomaly type corresponding to the detected anomaly object on the basis of the basic characteristic amounts and the auxiliary characteristic amount currently watched by the characteristic amount watching unit 13.

Consequently, without requiring a long time to detect an anomaly image, an anomaly cause is properly determined. In addition, a trouble and a part that causes the trouble are determined in an early stage before reaching a usage limit, and consequently, such usage limit tends not to occur and an anomaly is restrained until such usage limit.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
   an anomaly detecting unit configured to detect an anomaly object in a target image;
   an characteristic amount watching unit configured to (a) watch at least two basic characteristic amounts of the anomaly object, (b) determine whether values of the basic characteristic amounts satisfy a predetermined watching determination condition of any one of predetermined plural anomaly types or not, (c) if it is determined that the values of the basic characteristic amounts satisfy the watching determination condition, determine as an auxiliary characteristic amount for the anomaly object a characteristic amount corresponding to the anomaly type of which the values of the basic characteristic amounts satisfy the watching determination condition, and (d) start watching a value of the auxiliary characteristic amount; and
   an anomaly type determining unit configured to determine an anomaly type of the anomaly object on the basis of the basic characteristic amounts and the auxiliary characteristic amount currently watched by the characteristic amount watching unit.

2. The image processing apparatus according to claim 1, wherein the characteristic amount watching unit (a) derives an anomaly level from the values of the basic characteristic amounts, and (b) if a value of the anomaly level exceeds a predetermined first threshold value, determines that the watching determination condition is satisfied, and starts watching a value of the auxiliary characteristic amount corresponding to the anomaly type of this watching determination condition.

3. The image processing apparatus according to claim 2, wherein if a value of the anomaly level gets lower than a predetermined second threshold value, the characteristic amount watching unit terminates the watching a value of the auxiliary characteristic amount corresponding to the anomaly type of this watching determination condition.

4. The image processing apparatus according to claim 3, wherein the characteristic amount watching unit (a) determines plural auxiliary characteristic amount sets as a characteristic amount corresponding to a specific anomaly type, (b) selects one of the plural auxiliary characteristic amount sets and determines as the auxiliary characteristic amount one or plural characteristic amounts included by the selected auxiliary characteristic amount set, and (c) if the watching is terminated of all of the one or plural characteristic amounts included by the selected auxiliary characteristic amount set, selects another auxiliary characteristic amount set among the plural auxiliary characteristic amount sets, and determines as the auxiliary characteristic amount one or plural characteristic amounts included by the selected auxiliary characteristic amount set.

5. The image processing apparatus according to claim 4, wherein the characteristic amount watching unit (a) selects one anomaly type among anomaly types other than the anomaly type of the auxiliary characteristic amount to be watched, on the basis of a distance from the values of the basic characteristic amounts to values of the basic characteristic amounts that satisfy the watching determination condition of an anomaly type other than the auxiliary characteristic amount to be watched, and (b) includes the auxiliary characteristic amount corresponding to the selected anomaly type into the auxiliary characteristic amount set.

6. The image processing apparatus according to claim 1, wherein while watching values of the plural auxiliary characteristic amounts, if a part of the plural auxiliary characteristic amounts goes out of a range corresponding to the values of the basic characteristic amounts but a remaining part of the plural auxiliary characteristic amounts does not go out of a range corresponding to the values of the basic characteristic amounts, the characteristic amount watching unit terminates the watching of the auxiliary characteristic amount for the part of the plural auxiliary characteristic amounts and continues the watching of the auxiliary characteristic amount for the remaining part of the plural auxiliary characteristic amounts.

7. The image processing apparatus according to claim 2, wherein if fluctuation widths of values of the anomaly level and the auxiliary characteristic amount are equal to or less than predetermined values during a predetermined period, the characteristic amount watching unit terminates the watching of this auxiliary characteristic amount.

8. The image processing apparatus according to claim 1, wherein the anomaly type determining unit (a) derives an anomaly level from the values of the basic characteristic amounts, and (b) if a value of the anomaly level exceeds a specific determination threshold value of the anomaly type, determines that a part corresponding to this anomaly type reaches a usage limit; and if fluctuation widths of values of the anomaly level and the auxiliary characteristic amount are equal to or less than predetermined values during a predetermined period, the characteristic amount watching unit sets the determination threshold value on the basis of a value of this auxiliary characteristic amount.

9. The image processing apparatus according to claim 1, wherein (a) if fluctuation widths of values of the anomaly level and the auxiliary characteristic amount are equal to or less than predetermined values during a predetermined period, the characteristic amount watching unit selects a characteristic amount for watching image quality and adds the selected characteristic amount to the auxiliary characteristic amount; and (b) if a value of the characteristic amount for watching image quality in watching exceeds a predetermined threshold value, the characteristic amount watching unit determines that image quality degradation occurs.

10. The image processing apparatus according to claim 1, wherein even though the characteristic amount watching unit watches values of respective auxiliary characteristic amounts corresponding to predetermined plural anomaly types, if the anomaly type determining unit can not determine the anomaly type corresponding to the anomaly object, the anomaly type determining unit determines that the anomaly object is an anomaly object of an unknown anomaly type.

11. An image forming apparatus, comprising:
an image processing apparatus; and
an internal device configured to generate a target image;
wherein the image processing apparatus comprises:
an anomaly detecting unit configured to detect an anomaly object in the target image;
an characteristic amount watching unit configured to (a) watch at least two basic characteristic amounts of the anomaly object, (b) determine whether values of the basic characteristic amounts satisfy a predetermined watching determination condition of any one of predetermined plural anomaly types or not, (c) if it is determined that the values of the basic characteristic amounts satisfy the watching determination condition, determine as an auxiliary characteristic amount for the anomaly object a characteristic amount corresponding to the anomaly type of which the values of the basic characteristic amounts satisfy the watching determination condition, and (d) start watching a value of the auxiliary characteristic amount; and
an anomaly type determining unit configured to determine an anomaly type of the anomaly object on the basis of the basic characteristic amounts and the auxiliary characteristic amount currently watched by the characteristic amount watching unit.

12. An image processing method comprising the steps of detecting an anomaly object in a target image;
(a) watching at least two basic characteristic amounts of the anomaly object, (b) determining whether values of the basic characteristic amounts satisfy a predetermined watching determination condition of any one of predetermined plural anomaly types or not, (c) if it is determined that the values of the basic characteristic amounts satisfy the watching determination condition, determining as an auxiliary characteristic amount for the anomaly object a characteristic amount corresponding to the anomaly type of which the values of the basic characteristic amounts satisfy the watching determination condition, and (d) starting watching a value of the auxiliary characteristic amount; and
determining an anomaly type of the anomaly object on the basis of the currently watched basic characteristic amounts and the currently watched auxiliary characteristic amount.

* * * * *